(12) United States Patent
Trickett

(10) Patent No.: US 6,895,336 B2
(45) Date of Patent: May 17, 2005

(54) METHOD OF USING MATRIX RANK REDUCTION TO REMOVE RANDOM NOISE FROM SEISMIC DATA

(75) Inventor: Stewart Roy Trickett, Calgary (CA)

(73) Assignee: Kelman Technologies, Inc., Calgary (CA)

( * ) Notice: Subject to any disclaimer, the term of this patent is extended or adjusted under 35 U.S.C. 154(b) by 0 days.

(21) Appl. No.: 10/660,713

(22) Filed: Sep. 12, 2003

(65) Prior Publication Data

US 2004/0054479 A1 Mar. 18, 2004

Related U.S. Application Data

(60) Provisional application No. 60/410,473, filed on Sep. 12, 2002.

(51) Int. Cl.[7] .................................................. G01V 1/28
(52) U.S. Cl. ....................................................... 702/17
(58) Field of Search .............................. 702/14, 16, 17, 702/18; 367/73, 43, 45

(56) References Cited

U.S. PATENT DOCUMENTS

| | | | | |
|---|---|---|---|---|
| 4,594,693 A | * | 6/1986 | Pann et al. ..................... 367/43 |
| 5,067,112 A | * | 11/1991 | Meek et al. .................... 367/43 |
| 5,379,268 A | | 1/1995 | Hutson | |
| 6,151,556 A | * | 11/2000 | Allen ........................... 702/18 |
| 6,446,007 B1 | * | 9/2002 | Finn et al. ..................... 702/14 |
| 6,766,252 B2 | * | 7/2004 | Blanch et al. .................. 702/6 |
| 2003/0200031 A1 | * | 10/2003 | Kok ............................. 702/17 |

OTHER PUBLICATIONS

Tuanyi et al., (Seismic Data Time–Frequency Domain Filter with Wavelet Transform, IEEE International Conference on Intelligent Processing Systems, Oct. 28–31, 1997, pp. 1223–1226.*

* cited by examiner

*Primary Examiner*—Donald McElheny, Jr.
(74) *Attorney, Agent, or Firm*—Gowling Lafleur Henderson LLP; D. Doak Horne (57) ABSTRACT

A frequency domain based method using matrix rank reduction for removing noise from seismic data sets is provided using a variety of 3D eigen filtering techniques. A rank reduced grid of traces or proxy cube that is representative of an original grid of Traces, but that has a better signal to noise ratio results since the surviving data elements represent the bulk of the composite signal related to genuine reflectors—whereas the trivial elements replace a large portion of the composite signal related to random noise. There is no compression of the elements of the representative matrices. The use of a series of proxy cubes in place of the co-ordinate pair related original CUBEs of seismic data results in several advantages including reduced processing time and better accuracy at the boundaries of the subject section.

12 Claims, 10 Drawing Sheets

METHOD OF USING MATRIX RANK REDUCTION TO REMOVE RANDOM NOISE FROM SEISMIC DATA

RELATED APPLICATIONS

Priority is claimed from U.S. provisional application 60/410,473 filed Sep. 12, 2002, entitled METHOD OF USING MATRIX RANK REDUCTION TO REMOVE RANDOM NOISE FROM SEISMIC DATA PROCESSED IN THE F-XY DOMAIN listing Stewart Roy Trickett as inventor, such provisional application incorporated herein by reference.

This application claims the benefit of provisional application No. 60/410,473, filed Sep. 12, 2002.

FIELD OF THE INVENTION

The present invention relates generally to processing seismic data and particularly to reducing noise in seismic data using a variety of 3D eigen filtering techniques based on matrix rank reduction in the frequency domain.

BACKGROUND OF THE INVENTION

Seismic data can be used to interpret or to infer subsurface geology, making it useful for the location, identification and exploitation of petroleum and minerals. However since seismic traces are often contaminated by random noise, seismic data sets typically undergo a series of conventional statistical processes (known as "seismic processing") before the data can be so used. It is advantageous to remove noise at an early stage in processing, since this improves the ability to perform all subsequent processing work. Conventional seismic processing disadvantageously degrades or distorts signal prior to removing sufficient noise for some purposes. Conventional seismic processing methods are based on functions and their transforms that it is often useful to think of as occupying two domains. These domains have been referred to as the function and transform domains, but more commonly they are known as the time and frequency domains. Operations performed in one domain have corresponding operations in the other. For example, the convolution operation in the time domain becomes a multiplication operation in the frequency domain and the reverse is also true, permitting users to move easily between domains so that operations can be performed where they are easiest. A seismic audio signal being sampled at 8 Hz means that at each successive eighth of a second a measurement of the intensity of the signal is taken. The Fourier transform decomposes or separates a waveform or function into sinusoids of different frequency, which sinusoids sum to the original waveform. It identifies or distinguishes the different frequency sinusoids and their respective amplitudes. The Discrete Fourier Transform (DFT) is useful because a digital computer works only with discrete data, numerical computation of the Fourier transform of f(t) requires discrete sample values of f(t), which are called $f_k$. In addition, a computer can compute the transform F(s) only at discrete values of s, in other words it can only provide discrete samples of the transform, $F_r$. It is well understood that a Discrete Fourier Transform ("DFT") is a Fourier transform calculated for a wavelet over a finite interval so that values are given only for the fundamental frequency (reciprocal of the interval) and its harmonics. And a "trace" is a time domain record of seismic data from a single electromagnetic channel.

Within the seismic industry sections of data are comprised of several "grids" that form cubes of data when used to correlate Cartesian (x-y surface) coordinates to either a time domain or frequency domain that covers a finite range of time or frequency respectively. In a Time Cube; a trace is a temporal record of data from a single seismic channel, the sensor for which is located on a point of intersection defined according to a given scale of abscissas (i.e. along the X-axis) and ordinates (i.e. along the Y-axis)—each of which points of intersection are identified by a co-ordinate pair and all of which points of intersection form a planar rectangular "grid". The $3^{rd}$ dimension being time, a "trace" forms as seismic energy (typically in the form of acoustic signal amplitude) sample recordings are captured from the sensor location identified by the subject co-ordinate pair, over a finite range of time (e.g. 2 seconds) at defined (e.g. 10 millisecond) intervals. The scope and depth of the data comprising a Time Cube is related to the number of elements (Cartesian co-ordinate pairs), the time, and the sampling rate through that time. For example, in each 25×25 "grid" there will be 625 traces forming a time record of signals (comprising both genuine reflected energy and noise) recorded in relation to the subject section (i.e. 1 data element associated with each co-ordinate pair=625 data elements per sample period). With each trace having samples captured every 10 milliseconds over 2 seconds, this Time Cube would contain 125,000 data elements.

Figure 1:
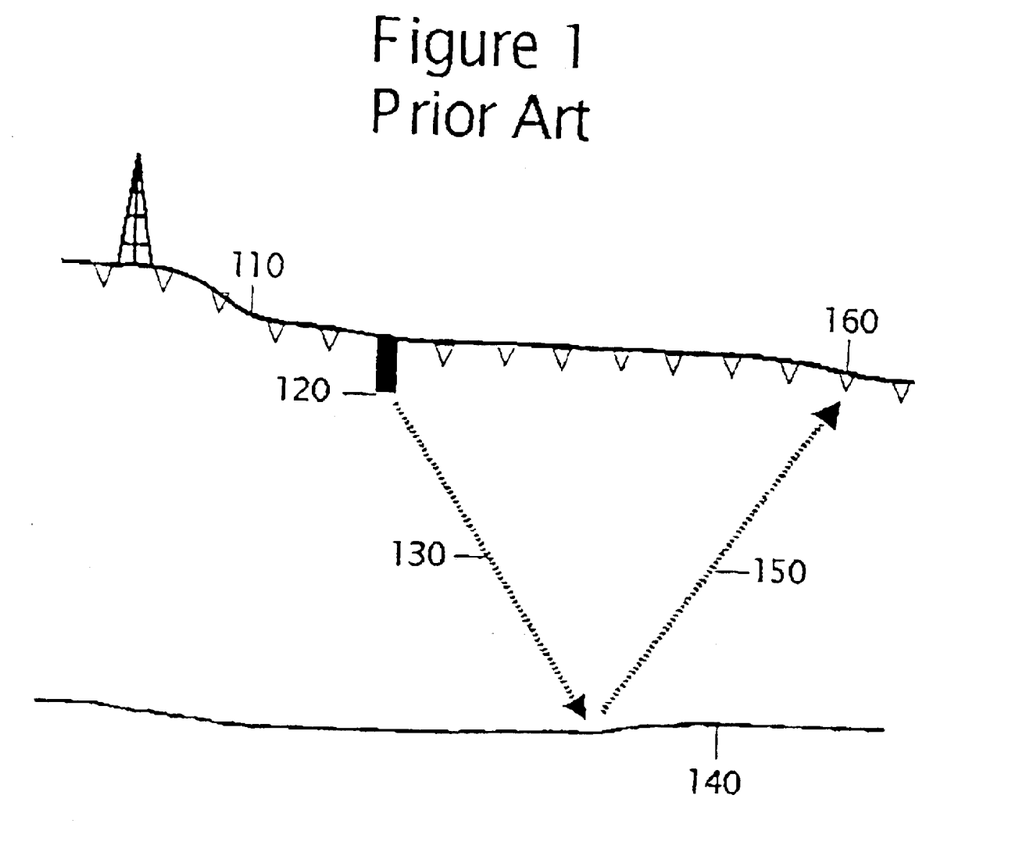

Prior Art FIG. 1 illustrates a typical geological exploration setup for acquiring seismic data. Positioned at or just below the earth's surface 110, an energy source 120 (typically explosive high-energy or vibrational low energy source having an effective length of only 20 to 40 ms) generates at least one sound wave or signal (the wavefront resulting from which is typically recorded for approx. 3 seconds) having sufficient energy to follow path 130 down into the earth a suitable distance to reflect at the interface of any changes in geology (commonly known as "events" or "reflectors") 140, the reflected energy traveling back to the surface via path 150 is simultaneously recorded by receivers 160 (commonly geophones positioned as an array for 3D, or a line for 2D exploration). In marine seismic the sound wave is generated just below the surface of the water and the reflected energy detected by hydrophones. For each such sound wave generation, or "shot", the reflected signal returning to the surface via path 150 creates a "trace", which is a single recording at a receiver 160. Traces are detected and recorded in the form of a time series of sample measurements of particle velocity (for land data) or pressure change (for marine data). Many shots are taken to generate a seismic data set, often resulting in hundreds of millions of traces that may be stacked of summed in a variety of ways. When high energy impulsive seismic sources are used, the level of the detected true earth response seismic signal is usually greater than the ambient noise. However, when low energy surface seismic sources are used, the ambient noise can be at a level greater than the true earth response seismic signal. For this reason, seismic-trace recordings are often made involving the repeated initiation of a low energy surface seismic source at about the same origination point, thereby producing a sequence of seismic-trace data based on seismic wave reflections and/or refractions that have traveled over about the same path and therefore have approximately the same travel times. The process of adding such seismic-trace data together for improving the signal-to-noise ratio of the composite seismic-trace recording is known as "vertical compositing" or "vertical stacking." It should be distinguished from "horizontal stacking," a process applied to a sequence of seismic-trace data based on seismic wave reflections from approximately the same subsurface point (referred to as the "common-depth point," or "CMP") but which has been generated and recorded at different surface locations. Horizontal stacking of CMP seismic-trace data requires that time corrections (called "normal moveout," or "NMO," corrections) be applied before the traces are summed together, since travel times from seismic source to detector are unequal for each trace in the sequence. It can be assumed that the true earth response seismic signal embedded in each trace is coherent and in phase (correlated) and that the noise is random and incoherent (uncorrelated) with zero mean value. In general, the objective of vertical stacking is to maximize the signal-to-noise ratio of the resultant recording. Reflectors that are not "flat" are said to "dip" or slope.

The use of a low energy vibrator can be more economical than the use of dynamite. Furthermore, as compared to the use of a high-energy impulsive seismic source, such as dynamite, the frequency of the seismic waves generated by a vibrator can be selected by controlling the frequency of the pilot signal to the power source, such as a hydraulic motor, which drives the vibrator. More particularly, the frequency of the pilot signal to the vibrator power source can be varied, that is, "swept," for obtaining seismic-trace data at different frequencies. A low energy seismic wave, such as generated by a vibrator, can be used effectively for seismic prospecting if the frequency of the vibrator "chirp" signal which generates the seismic wave is swept according to a known pilot signal and the detected seismic wave reflections and/or refractions are cross correlated with the pilot signal in order to produce seismic-trace recordings similar to those which would have been produced with a high energy impulsive seismic source. Typically, the pilot signal is a swept frequency sine wave that causes the vibrator power source to drive the vibrator for coupling a swept sine wave "chirp" signal into the earth. The swept frequency operation yields seismic-trace data that enables different earth responses to be analyzed, providing a basis on which to define the structure, such as the depth and thickness, of the subsurface formations. It is a problem that recorded seismic-trace data always includes some background (ambient) noise in addition to the detected seismic waves reflected and/or refracted from the subsurface formations (referred to as the "true earth response"). Noise can be classified as "stationary" and "non-stationary", both of which can be random. Stationary noise is random noise such as atmospheric electromagnetic disturbances that are statistically time-invariant over the period of acquisition of seismic-trace data for producing a recording. Non-stationary noise is random and often occurs as bursts or spikes generally caused by wind, traffic, recorder electrical noise, et cetera, which are statistically time-variant over the period of acquisition of seismic-trace data for producing a recording and exhibits relatively large excursions in amplitude. In connection with swept frequency operation of low energy vibrator seismic prospecting, it is common practice to vertically stack, or sum, the seismic-trace data from a series of initiations, that is, sequential swept frequency operations, to produce a composite seismic-trace recording for the purpose of improving the signal-to-noise ratio of the seismic-trace data. Unfortunately, the commonly used technique of vertically stacking trace data is inadequate in the presence of non-stationary noise that appears during such seismic prospecting.

Seismic data is acquired in two principal geometries: 2-D and 3-D. In 2-D acquisition, shots and receivers are positioned along a (not necessarily straight) surface line. In 3-D acquisition, shots and receivers are positioned over a 2-D surface area. Seismic data related to 3D geologic volumes necessarily includes random noise that may be isolated from the signal data to different degrees by different conventional techniques, including an eigenimage filtering technique that is 2D in nature and disadvantageously does not account for additional available information respecting the formation.

Figure 2:
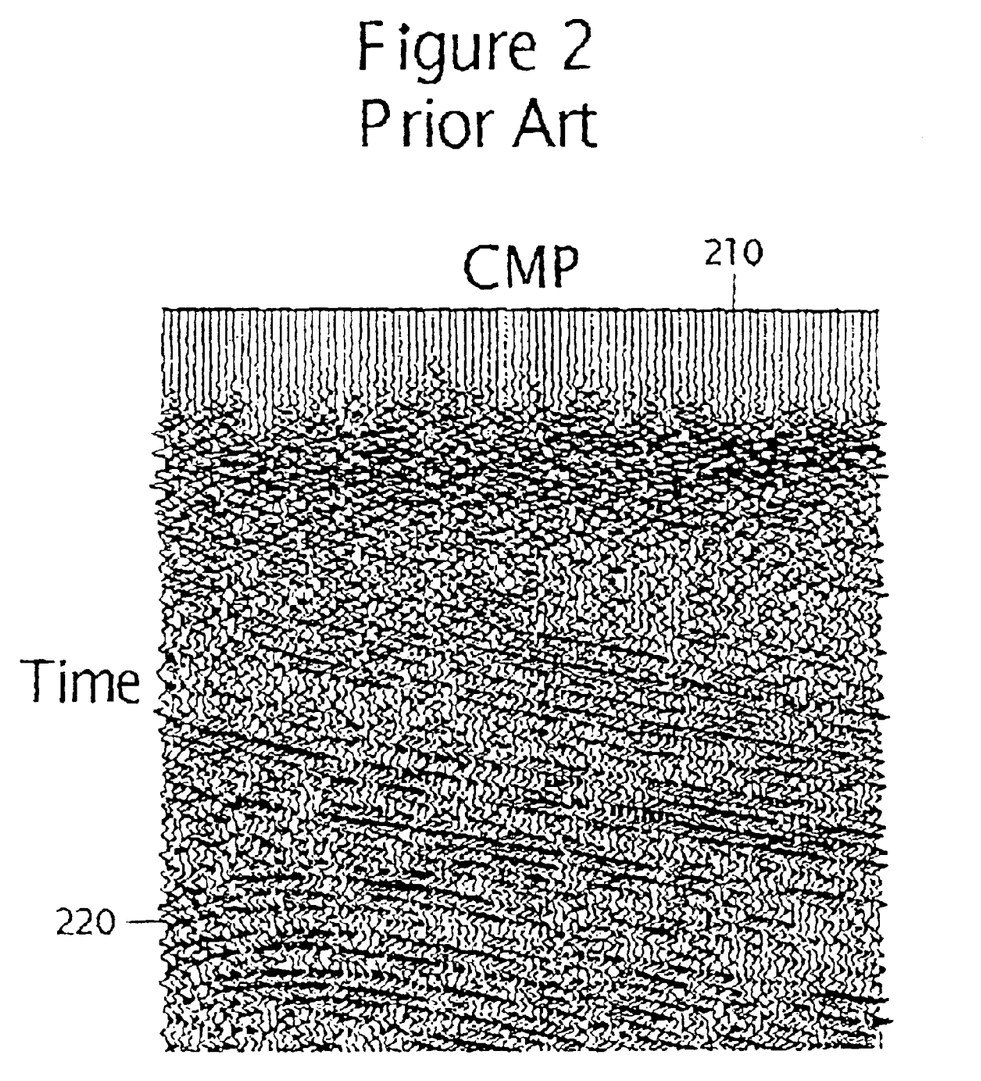
Figure 3:
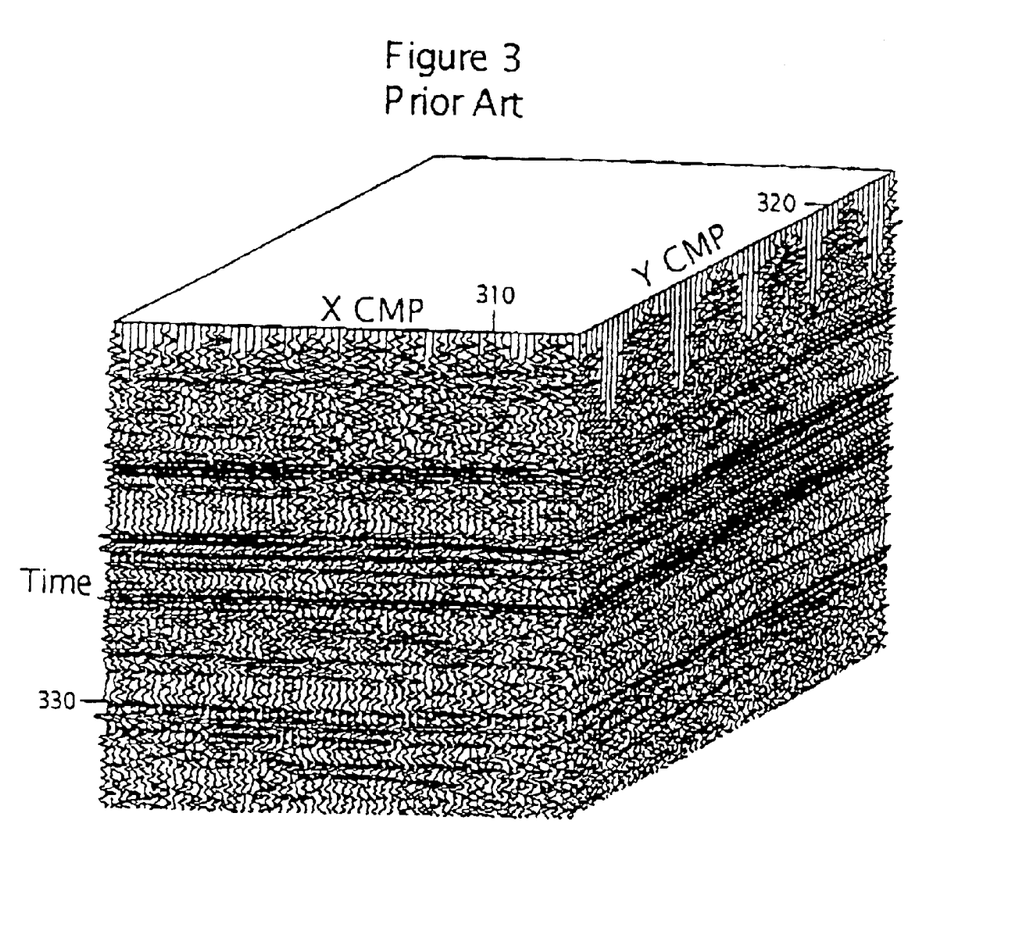

For 2-D acquisition the main product of seismic processing is a 2-D stacked "section" (illustrated in Prior Art FIG. 2), one of the dimensions representing horizontal position along acquisition line 210, and the other dimension representing time 220. For 3-D acquisition, seismic processing resulting in a 3-D stacked section (illustrated in Prior Art FIG. 3), two of the representing edges 310 and 320 of the acquisition surface area, and the other dimension representing time 330.

Known seismic processing steps include common-midpoint (CMP) stacking, where traces are collected into groups having roughly the same midpoints between the locations of the shot by which they were generated and the receiver at which they were detected. For each recorded time sample, the magnitudes or values of every trace in the group are summed together, producing a single "stacked" trace for each group. Such stacking commonly reduces the amount of data that must be processed by a factor of 10 to 100.

Geological interpretation is easiest and most successful on seismic sections having low levels of noise, and thus one of the objects of seismic processing is to remove as much noise as possible. Noise can be broadly categorised as random, coherent, or monochromatic. Random noise may be defined as noise that is uncorrelated between traces and spectrally broad band. Some of the causes of random noise are the effects of wind and other disruptions on the seismic receiver and cable, poor penetration of seismic energy through the earth (particularly in the near surface beneath the shot or receiver), and numerous natural and manmade seismic energy sources apart from the intended one. The most common stage to carry out random-noise removal is after CMP stacking. A number of methods have been developed to do this, including: f-K transform (March and Bailey, 1983), f-x prediction (Canales, 1984; Soubaras, 1994), Karhunen-Loeve transform (Jones and Levy, 1987; Al-Yahya, 1991), eigenimage (Ulrych, Sacchi, and Freire, 1999), spectral matrix filtering (Gounon, Marse, and Goncalves, 1998), and Radon transform (Russell, Hampson, Chun, 1990(a) and 1990(b)).

The foregoing methods work on 2-D data sets, but can be adapted for 3-D stacked sections by slicing the data volume along one of be spatial dimensions, filtering each of these slices separately as if it were a 2-D section, and then recomposing the 3-D volume. This can then be repeated in the opposite spatial direction. Such methods are not optimum in that they fail to fully exit the large amount of data available within a short radius of each spatial point of the 3-D volume. For this reason, "true 3-D" methods have been developed that work in both spatial dimensions simultaneously, including: f-xy prediction (Chase, 1992; Soubaras, 2000) and f-kk transform (Peardon and Bacon, 1992).

Random noise removal before CMP stacking is less common. There are, however, at least two advantages to removing random noise as early in the processing stream as possible. First, it improves the performance of subsequent processes, notably deconvolution, statics correction, and velocity analysis. Second, it has the potential to be more effective since more data is available before stacking, providing better statistical redundancy. At the same time, extra data means that random noise removal before CMP stacking requires more computation. Noise removal before statics or deconvolution faces the problem of "surface consistent effects", meaning effects that are constant within each shot and receiver, but that may change radically even between adjacent shots and receivers. If these effects have not been corrected before noise removal then the noise removal process must preserve them, one method for this is surface-consistent f-x prediction (Wang, 1996).

Another application of noise removal is common-offset or common-angle stacks for amplitude versus offset (AVO) or amplitude versus angle (AVA) analysis. Such stacks are used for the automatic computation of parameters for interpretation. These stacks require a low level of noise so the computed parameters are as accurate as possible. In 2-D acquisition, AVO/AVA stacks form a 3-D volume in which the two spatial dimensions are CMP and either offset or angle. In the offset-angle dimension there may be only one or two dozen traces, such that much of the data is on or near a spatial boundary. Disadvantageously even the better noise removal methods, such as f-xy prediction, do not perform well near spatial boundaries, resulting in distortion of the signal, and possible distortion of the computed parameters—creating the need for a noise removal method that performs well at spatial boundaries.

Some conventional noise removal methods such as Karhunen-Loeve, time-domain eigenimage filtering, Radon transform, and f-K and f-kk transforms, only work well on plains-type data received from geological formations in which most of the reflectors are flat. Disadvantageously on more structured data received from geological formations in which reflectors are strongly dipping or sloping, these methods become computationally expensive, difficult to use, or less effective. Accordingly, there is a need for a method of noise removal that performs well on all types of geology.

Many methods for removing noise from seismic data are implemented using matrix operations. For example, matrix compression is one process for determining an approximation to a given matrix, which approximation consumes less space than the original matrix. However, matrix rank reduction is to determine the nearest (with respect to a particular matrix norm) rank-K matrix to a given matrix. A matrix norm measures the size of a matrix, for example, the "Frobenius norm" is the square root of the sum of the square of the matrix elements, whereas the "L1 matrix norm" is the sum of the absolute values of the elements of the given matrix.

Prior art reviewed includes U.S. Pat. No. 5,379,268 to Hutson, who teaches compression of the subject matrix (see claim 1($b$)) as the core of his improvement Compression and rank reduction have some similarities, but are not identical, in that rank reduction can be used as a step within matrix compression, but rank reduction can also be performed without any resulting matrix compression. Hutson in 268 teaches compression—by active decomposition (expanding the original data matrix), then actively and selectively zeroing (whereas modifying to a value other than zero does not "compress") singular values in one of the resulting matrices, thereafter recomposing those matrices into a single matrix that approximates the original—after which 268 proceeds to teach (see claim 1($c$)(1)) further processing of the signals approximated by the compressed matrix. However, 268 is vague even about the kind of compression and processing performed. For example modifying without zeroing cannot compress while zeroing inappropriate selections can actually be counterproductive by eliminating signal rather than noise.

Disadvantageously, existing noise removal algorithms do not handle erratic noise well. For example, both SVD and Lanczos methods of matrix rank reduction attempt to find a rank-K matrix that is nearest to the input matrix in a Frobenius-norm sense. This is appropriate for removing random noise that has a Gaussian, or bell-shaped, statistical distribution—which does not perform as well when erratic non-Gaussian noise bursts are present.

Processing seismic data is typically time consuming and expensive because it involves large quantities of data. Therefore, it is desirable to provide a solution to at least some of the above-described problems of the prior art reducing either or both the quantity of data processed or the amount of processing required in relation to that data. The prior art includes some matrix rank reduction and frequency domain based methods, but there is a need for a new combination of such methods that overcomes the above disadvantages, particularly for the purpose of noise suppression in sections of seismic data.

SUMMARY OF THE INVENTION

In accordance with one of its aspects the present invention comprises a method based on finding the rank K matrix nearest to a given matrix after which the smallest K value is used based on which the difference plot show insignificant signs of signal. According to the method aspect of the present invention random noise is removed from a seismic data set by the following steps: the subject seismic data set is spatially divided into overlapping, rectangular grids of traces; each said grid is processed by transforming it into the frequency domain using a Discrete Fourier Transform (DFT); the grid is then separated into constant-frequency slices; all or a subset of said slices in matrix form are then individually rank-reduced after which the grid is reformed using the rank-reduced forms; an inverse DFT is then executed on each (frequency ordered) trace of the reformed grid transforming the traces back into the time domain but with noise suppressed and ready for use in vizualisation or interpretation; once all of the required grids are so processed, the entire seismic data set may be reformed using the reformed grids.

In accordance with one of its aspects the present invention comprises a method of removing noise from a time-domain based CUBE of seismic data consisting of a plurality of Traces, the method comprising the steps: transform each said Trace into the frequency-domain, for the purpose of creating a frequency-domain based CUBE of seismic data, wherein the seismic data elements of said frequency-domain based CUBE are complex-valued; disassemble said frequency-domain based CUBE into a plurality of constant frequency slices, each of said constant frequency slices consisting of a plurality of seismic data elements; and for each constant frequency slice of said plurality of constant frequency slices: form one Matrix $A_{m \times n}$ from each said constant frequency slice using said plurality of seismic data elements as the complex-valued elements of said Matrix $A_{m \times n}$; rank-reduce Matrix $A_{m \times n}$ to create a rank-reduced Matrix $B_{m \times n}$ that is representative of Matrix $A_{m \times n}$, substitute Matrix $B_{m \times n}$ in place of Matrix $A_{m \times n}$, for the purpose of forming a proxy slice that is representative of said constant frequency slice; assemble a proxy frequency-domain based cube using said proxy slice, for the purpose of accessing each proxy trace in a plurality of frequency ordered proxy traces that are representative of said plurality of Traces; and inverse transform into the time-domain each proxy trace of said plurality of frequency ordered proxy traces, for the purpose of forming a noise-suppressed time-domain based proxy cube representative of said time-domain based CUBE of seismic data.

Processing seismic data via the method of the present invention results in a grid that is representative of an original grid, but advantageously has a better signal to noise ratio. This advantage results in part from having fewer non-trivial data elements in each of a set of representative grids, since the surviving data elements represent the bulk of the composite signal related to genuine reflectors—whereas the trivial elements replace a large portion of the composite signal related to random noise. Unlike the prior art, there is no compression of the elements of the representative matrices. The method aspect of the present invention improves the interpretability of processed seismic data and works at almost any stage of signal processing. For example, since it preserves surface-consistent effects, this method may be applied before statics correction or deconvolution. It may also be used to remove noise on 3-D volumes of stacked traces as well as common-offset or common-angle stacks. This method can be used to remove coherent noise from seismic traces and addresses non-uniform shooting patterns. For stacked 3-D volumes this method can be executed faster than f-xy prediction filtering and advantageously provides better results along the boundary of the subject volume. For removing noise on common-offset or common-angle stacks, and for removing noise on pre-stack data, the present invention is superior to standard f-xy prediction filtering since due to a synergy resulting from the manner in which the grid is formed, the method of the present invention is faster and can preserve surface-consistent effects thereby allowing it to be applied before statics correction or deconvolution. For example, the method of the present invention uses an m-by-n 2-D grid of seismic traces, the spatial locations of which need not be truly rectangular (e.g. a parallelogram). Similarly, the distances between grid lines in either the row or column directions need not be evenly spaced. And, the steps of the method of the present invention need not be performed on an entire data set since an appropriate subset of all available frequencies may be used to target reflectors located at specific co-ordinate pairs. The amount of noise removed using the method of the present invention can be increased by increasing the grid dimensions m and n, or by decreasing the rank K. A 2-D grid of seismic traces suitable for processing via the method of the present invention may, for example but not in limitation, originate from:

- a rectangle of traces extracted from a stacked 3-D volume. The trace grid being comprised of inline CMP bins in the row direction, and crossline CMP bins in the column direction;
- traces from an unstacked 2-D line. The grid is composed of common source traces in the row direction, and common receiver traces in the column direction;
- traces from an unstacked 3-D volume, where the traces are taken from a single shot line and receiver line. The trace grid being comprised of common source traces in the row direction, and common receiver traces in the column direction; or
- traces from common-offset or common-angle stacks for a sequence of CMPs. The trace grid being comprised of common-offset or -angle traces in the row direction, and CMP traces in the column direction.

In order to overcome the disadvantages of the prior art in one of its aspects the present invention comprises a novel method based on matrix rank reduction for removing noise from seismic data sets, which method is frequency domain based and less time consuming and expensive to execute by reducing the amount of data processing required. According to one embodiment of the method of the invention it is not necessary to fully decompose the subject matrix or to "zero out" elements because partial decomposition results in the desired matrix elements being extracted early in the decomposition process, permitting decomposition to be terminated before completion.

The accompanying drawings, which are incorporated in and constitute a part of this specification, illustrate preferred embodiments of the method, system, and apparatus according to the invention and, together with the description, serve to explain the principles of the invention.

BRIEF DESCRIPTION OF THE DRAWINGS

The present invention, in order to be easily understood and practised, is set out in the following non-limiting examples shown in the accompanying drawings, in which:

FIG. 1. is Prior Art and an illustration of the typical system used in the acquisition of a single seismic shot FIG. 2. is Prior Art and an illustration of a typical 2-D stacked seismic section FIG. 3. is Prior Art and an illustration of a typical 3-D stacked section of seismic data the X and Y planar surface of which includes a grid of co-ordinate pairs the data associated with which grid over time forms a CUBE of seismic data FIG. 4. is a summary flow chart of an embodiment of the method of the present invention FIG. 5. is a more detailed flow chart illustrating the removal of noise from data associated with a grid of traces FIG. 10. is a more detailed flow chart illustrating one embodiment of the method of the present invention for the removal of noise from a CUBE of seismic data FIG. 6. is a flow chart illustrating one way to reduce the rank of a matrix FIG. 7. is a flow chart relating to the selection of rank K FIG. 8. is a surface stacking diagram describing the acquisition of a 2-D acquisition seismic line FIG. 9. illustrates the positions of shots and receivers in a 3-D acquisition seismic array, and the selection of a particular shot and receiver line for individual noise removal

DETAILED DESCRIPTION OF THE PREFERRED EMBODIMENT

Reference is to be had to FIGS. 4–10 in which identical reference numbers identify similar components.

Figure 4:
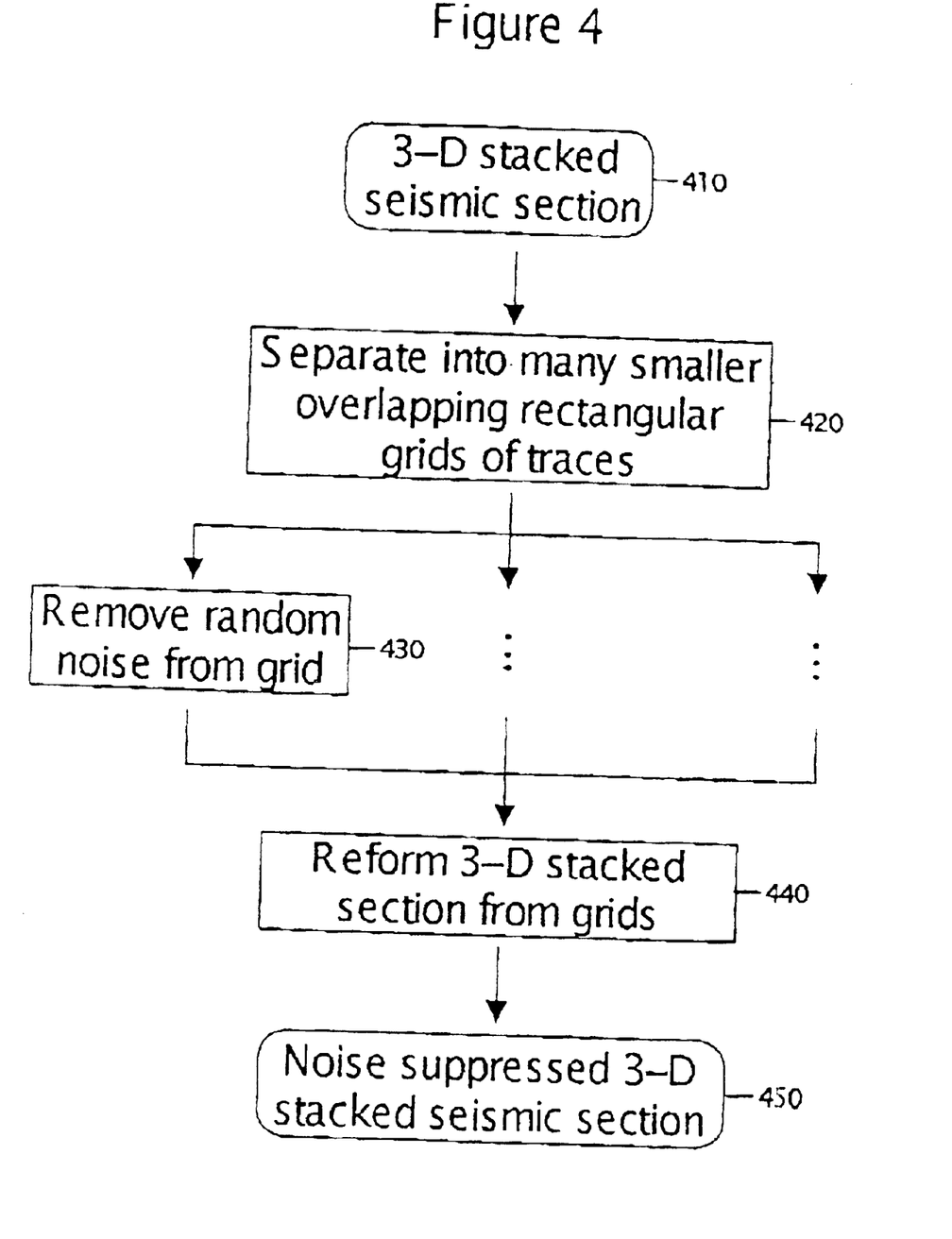

According to one embodiment of the method of the present invention FIG. 4 outlines a method for the removal of random noise from a section of seismic data 410. The section may be in 2-D or 3-D, stacked or not stacked. Although there are no known theoretical limits to the size of the grid that would benefit from such noise suppression, experience suggests that efficient results are achieved when grid sizes of between 20×20 and 30×30 traces are used. The reason for the difference between theory and practice relates to the trade-off between noise suppression and "mixing" or "geology smearing". For example, using any industry standard spacing and a section based on a grid of 1000×1000 traces, it would be beneficial to spatially divide the larger data set into overlapping rectangular grids of 25×25 traces, which grids overlap on all edges such that the data set of the $1000^2$ section could be covered by approximately 2500 smaller grids each suitable for use in dusters of better focused subsets of grids targeting suspected reflectors of interest. While running the larger $1000^2$ data set as a single grid is possible and the results would include less random noise, experience indicates that such results would be degraded by smearing or mixing the subsurface geology unnecessarily because reflectors are typically small enough that reflected energy from them is not relevant to the grid that may be created from an entire data set. Consequently, spatially dividing a data set into smaller grids covering a target of interest represents a balance between noise suppression and smearing. As the confidence level associated with and interest in a particular target increases, according to an alternate embodiment of the method of the present invention, several smaller overlapping grids may be used to blanket the relevant target coordinates resulting in multiple layers of overlap surrounding a central location of interest. Experience shows that several small, closely-associated grids provide good correlation and are well suited for noise suppression by matrix rank reduction. Therefore, as appropriate, section 410 is spatially divided 420 into overlapping rectangular grids of traces. If a grid is missing traces (usually because it is located near the spatial boundary of said section), one inserts artificial traces having values of zero to complete it. At step 430 noise is removed from each of the grids into which section 410 has been divided, which removal may be done in parallel or sequentially. At step 440 section 410 is "reformed" using the noise suppressed grids, which results in a section that is representative of the original. At step 450 the noise suppressed section may be used to interpret subsurface geology in place of section 410.

Figure 5:
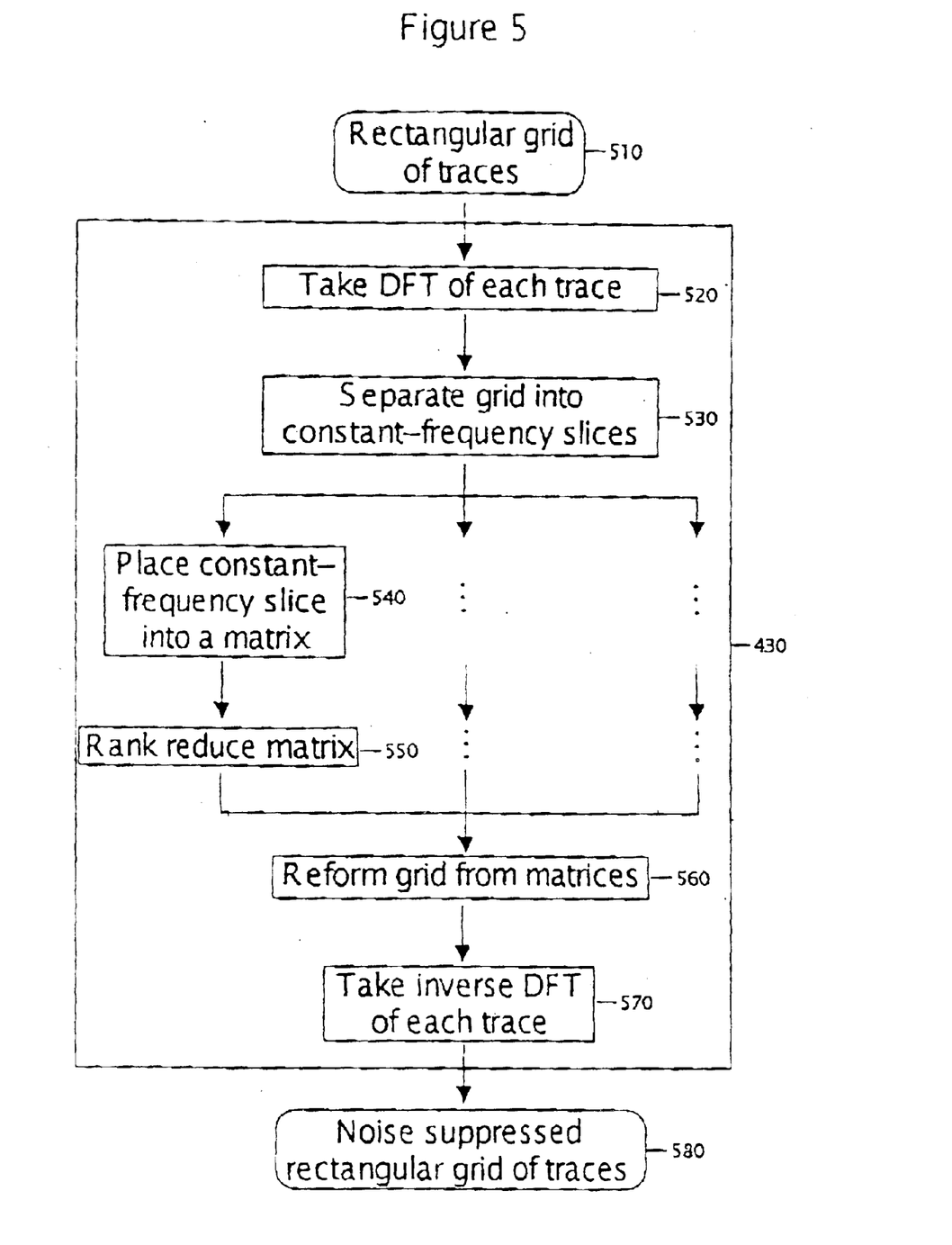

Referring to FIG. 5 there is illustrated one embodiment of the sub-steps of step 430 necessary to process each CUBE of data associated with the grids into which section 410 has been divided at step 420. Step 510 is the selection of a particular grid for noise suppression processing. At step 520 the transform of each trace in said grid is taken in order to create a CUBE of seismic data in the frequency domain, which CUBE is then disassembled into constant frequency slices at step 530. As shown in steps 540 and 550 the resulting slices may be processed in parallel. Noise reduction occurs when the data elements of each slice are placed into individual matrices that are subsequently rank-reduced. At step 560 a proxy cube representative of the CUBE of the original grid is formed by using the rank-reduced matrices in place of the matrices formed at step 540. At step 570 the inverse transform is taken of each trace in said proxy cube to return the output to the time domain and create a noise suppressed proxy cube or "grid of traces" that may be used to interpret subsurface geology in place of the particular grid selected at step 510.

Figure 10:
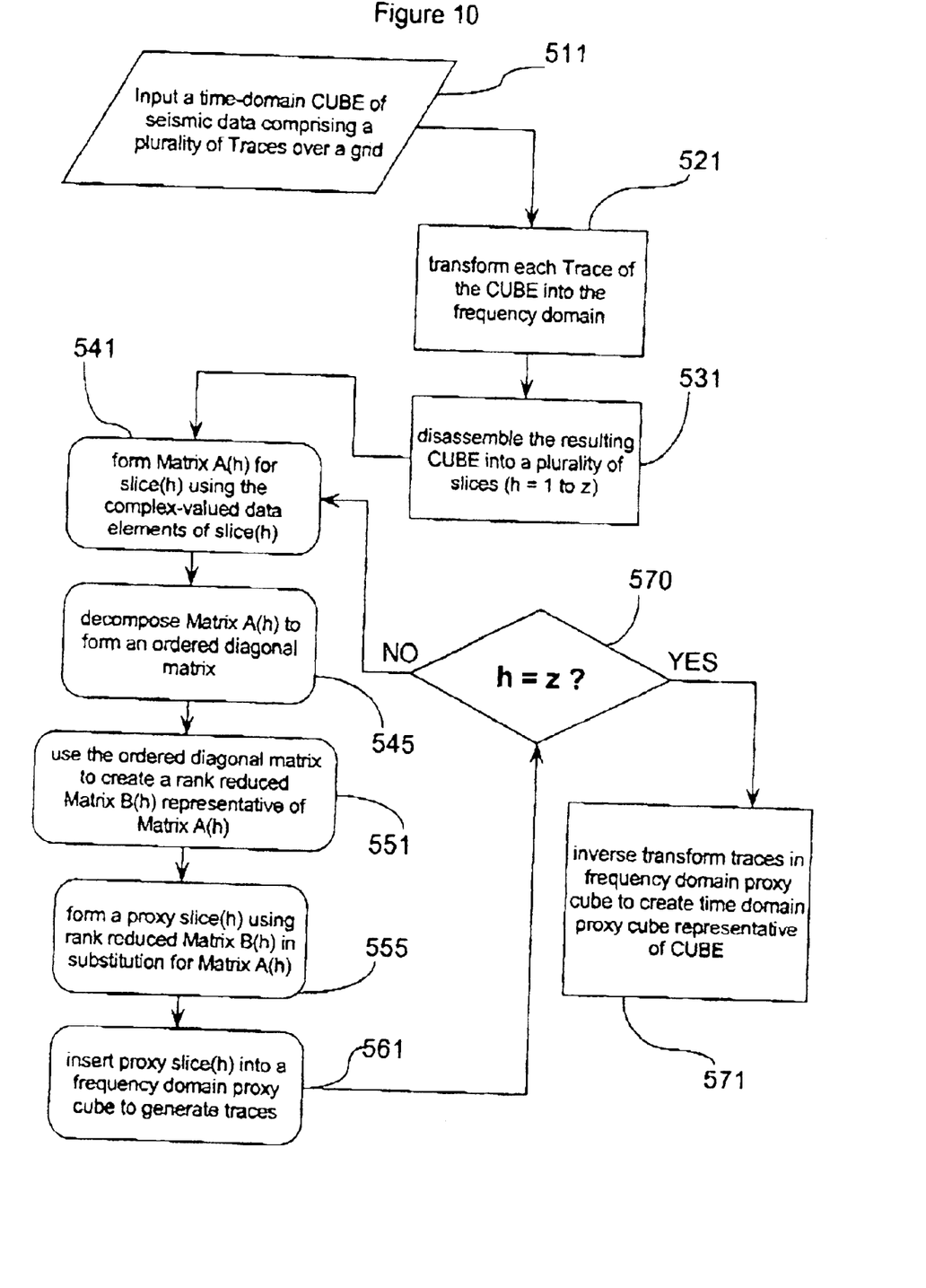

Referring to FIG. 10 there is illustrated one embodiment of the method of the present invention according to which each selected "grid of Traces" (or CUBE, each for example having 625 Traces) is input at step 511 for processing by first transforming at step 521 each Trace in the selected CUBE into the frequency domain using a Discrete Fourier Transform (DFT), thereby creating a record—across a finite range of frequencies—of the composite (i.e. reflection+noise) signal sampled at each co-ordinate pair of the subject grid. In this example the CUBE of 625 time traces becomes a transformed CUBE of 625 "traces" expressed in terms of frequency, such that the elements of the transformed data set are complex-valued. An alternate way of describing the shift between the time and frequency domains is the "re-ordering" of the grid output from time trace ordered to frequency ordered.

At step 531 the frequency transformed CUBE is sliced into a plurality on this example "h") of constant frequency slices. A slice is then taken out of the transformed CUBE representing the composite signal captured at each co-ordinate pair, but at a single frequency rather than time. In our example, each such 25×25 co-ordinate pair grid slice will include 625 complex-valued data elements that are susceptible to processing via matrix math. For each slice(h) there is a complex-valued Matrix $A_{m \times n}$ of the same dimensions, such that at step 541 we form one Matrix A(h) using the complex-valued data elements from the corresponding slice(h). As shown at step 570 the steps 541, 545, 551, 555, and 561 are repeated for each slice(h) corresponding to a selected value of h that may represent full or partial decomposition according to how much noise is to be removed from the grid of Traces or CUBE of interest.

According to a preferred embodiment of the method of the present invention, at step 545 the resulting Matrix A(h) is decomposed by applying, for example, Singular Value Decomposition ("SVD") to expand it into left singular vectors, singular values, and right singular vectors—resulting in 3 separate matrices, one of which is an ordered diagonal matrix. Conveniently, these data elements result in a Matrix A, where:

$A_{m \times n} = U \Sigma V^H$, where $\Sigma$ is an ordered diagonal matrix and U and $V^H$ are both unitary, since it is a property of SVD that U and $V^H$ are both unitary and that the elements of $\Sigma$ will be organized with the largest at $a_{11}$, $a_{22}$, $a_{33}$, ... decreasing to $a_{mn}$.

It is a property of the seismic record creation process that true reflected signal tends to be recorded or present primarily in the higher valued elements ($a_{11}$, $a_{22}$, $a_{33}$) of $\Sigma$ whereas random noise signal tends to be dispersed along the entire diagonal of $\Sigma$ According to an alternate embodiment of the method of the present invention step 545 may be skipped and processing may proceed directly to rank-reduction of Matrix $A(h)_{m \times n}$, by alternate means for the purpose of creating a rank-reduced complex-valued matrix of the same dimensions being Matrix B(h) that is representative of Matrix $A(h)_{m \times n}$.

Figure 6:
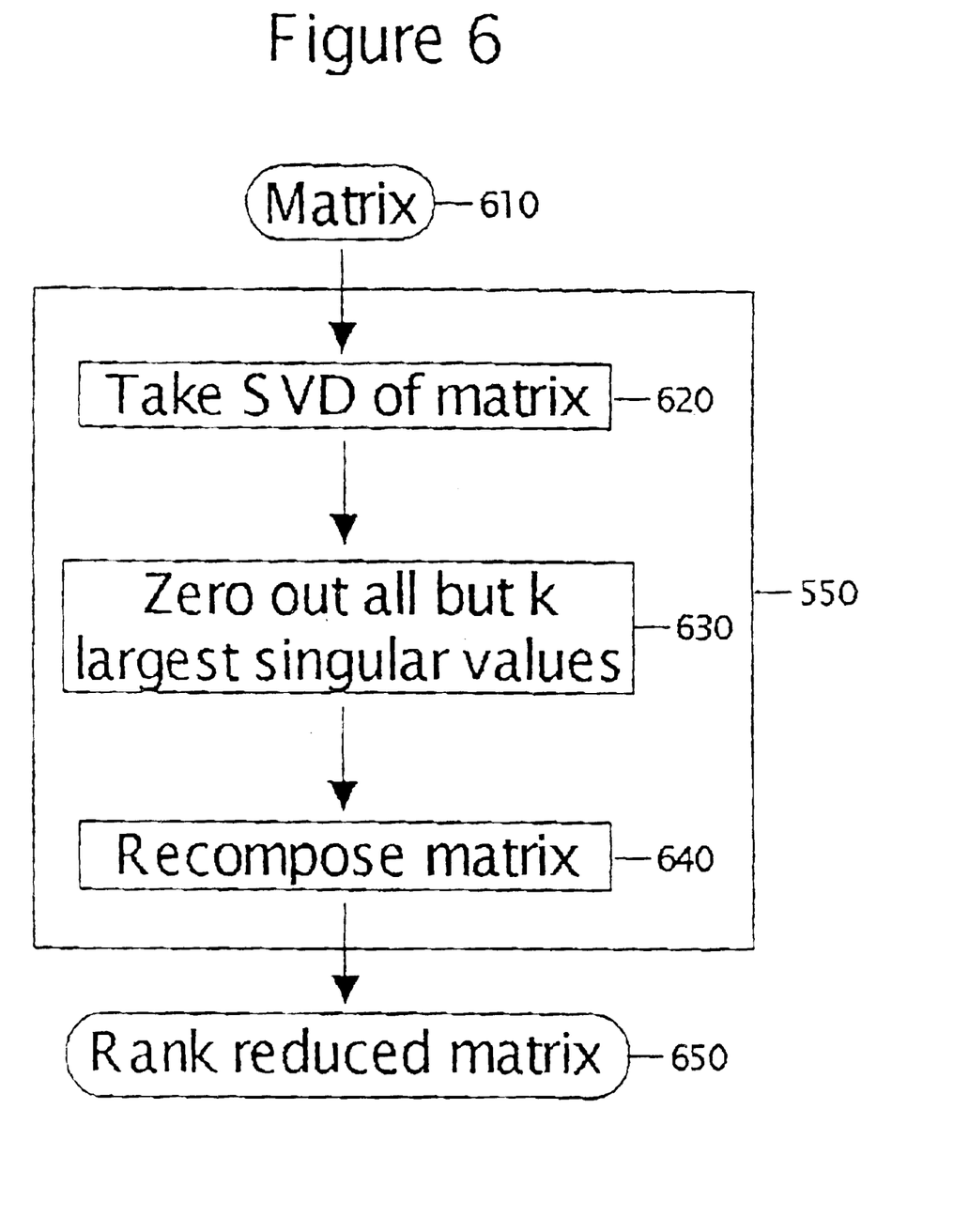

According to a preferred embodiment of the method of the present invention, at step 551 for each Matrix $A(h)_{m \times n}$, create a rank-reduced complex-valued matrix of the same dimensions being Matrix B(h) of rank K, (Note: each Matrix B has fewer non-trivial elements than the Matrix A that it represents) where K is less than the lesser of m or n. The selection of K is addressed below. Matrix B(h) of rank K results when in the ordered diagonal matrix $\Sigma$ (resulting from step 620) all but the top K elements along the diagonal are zeroed (as at step 630) and the matrix is reformed (at step 640) as: $B_{m \times n} = U \Sigma V^H$, where $\Sigma$ is the rank-reduced version of $\Sigma$ having only the top K elements remaining nontrivial. It is an important distinction that the top K elements are not compressed or otherwise modified. Similarly, neither is the ordered diagonal matrix $\Sigma$ compressed, but merely rank-reduced. It is to be understood that the purpose of this exercise is the suppression of noise in the output rather than the compression of the data set of the CUBE to save storage space.

According to an alternate embodiment it is contemplated that the top K elements may be weighted or otherwise adjusted or processed to advantage, particularly where the related data elements are at the boundary of the subject CUBE from which they are derived—or where there is an overlap of the co-ordinate pairs of such boundary with other CUBEs that relate to the target reflector(s) of interest.

According to the present example, if the CUBE is sliced at intervals of 0.5 Hz between 0 Hz and 250 Hz, processing would involve approximately 500 constant frequency slices each comprised of 625 complex-valued data elements. With 500 slices having been taken and processed, 500 rank reduced matrices $B_{m \times n} = U \Sigma V^H$ will result and each may be used at step 555 to form a frequency ordered proxy slice by substituting each Matrix B(h) for the corresponding Matrix A(h).

At step 561 a frequency (domain based) ordered proxy cube is formed using in this example each of the 500 rank reduced matrices $B_{m \times n} = U \Sigma V^H$ as a date set inserted at the frequency of the slice(h) that it represents. Once all 500 of the slices are so inserted the proxy cube will contain data respecting the composite signal recorded at each of the 625 co-ordinate pairs across a finite range of frequencies, however the ratio of true reflected to signal to noise signal will be increased. When h reaches a value that achieves the selected degree of decomposition (i.e. h=z) at step 570 the method proceeds to the final step 571 of the present embodiment and the frequency (domain based) ordered proxy cube is transformed back to the time domain. At step 571 an inverse DFT is performed on each of the 625 frequency ordered traces to return the data set to the time domain for visualization and other purposes. As each of these inverse transforms are executed a proxy time trace representative of the corresponding original time trace associated with the subject coordinate pair is formed. Once all 625 proxy time traces are formed the proxy cube is available for correlating with overlapping and nearby proxy cubes that may be compared, summed, or otherwise processed for use interpreting the subsurface reflectors respecting which the original CUBEs were selected.

Once all CUBEs are so noise-suppressed, one may form a representation of the entire original section by using all the proxy cubes. Where the co-ordinate pairs of the traces in nearby grids are the same, such overlap zones may be addressed by summing grid traces at the same (co-ordinate pair) position after scaling them with "weights" so that the sum of the weights at the overlap position is one. A person of skill in the art of seismic processing would know to select such weights to taper smoothly near the boundary of each rectangular grid.

According to the method of the present invention the selection of K for the purposes of rank reduction may be more refined or less discriminating (i.e. fine, moderate, coarse). A somewhat arbitrary choice of K=2 may for example lead to a moderate degree of noise suppression with a moderate degree of undesired loss of the signal from genuine reflectors. Choosing K=1 means that all but the all element of the ordered diagonal matrix Σ would be zeroed leading to a harsh degree of noise suppression, but almost certainly a significant and undesired loss of signal from genuine reflectors. By contrast, choosing K=3 tends to leave genuine signal in tact while achieving less noise suppression advantage.

According to an alternate embodiment of the method of the present invention non-integer values of K may be applied to fine tune the signal to noise ratio of the result. For example, a K value of 2.7 may be implemented by zeroing out all but the three largest singular values, and multiplying the third largest singular value by 0.7 before the matrix is recomposed. In this circumstance K no longer represents rank, but rather a degree of noise removal that is intermediate that of rank 2 and rank 3.

Since noise and signal are not universally distributed across all CUBEs it is advantageous to select K on a grid by grid basis permitting a more refined processing with the goal of an optimal balance between noise suppression and signal distortion.

Figure 7:
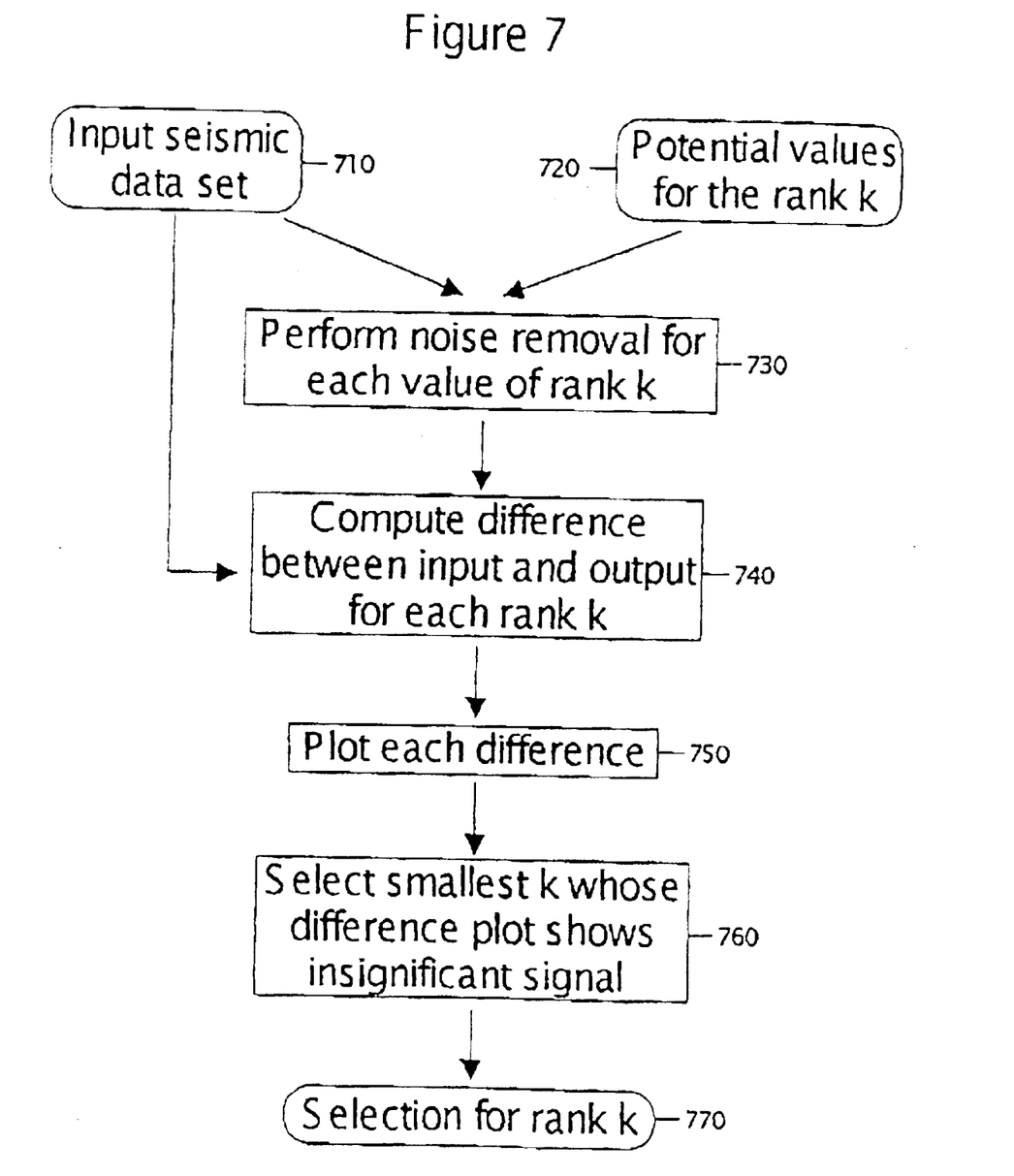

FIG. 7 illustrates one way to select rank K to remove noise without distorting the reflected signal of a seismic data set. For example for each of K values 1 through 5 (defined at step 720) at step 740 calculate the difference between Matrix A (i.e. the input data) and the Matrix B of rank K. At step 750 plot the difference (to quickly visualize how much of the signal has been removed) between Matrix A and Matrix B for each value of K (i.e. 1–5) and at step 760 select the value of K (.e.g. 3) the plot for which shows insignificant indications of signal (i.e. looks random with little coherence). A person of skill in the art of seismic processing will readily recognize when a difference plot contains too much signal.

Referring to FIG. 6 there is illustrated one means for executing step 545 to decompose each Matrix A(h). A person of skill in mathematics would understand that SVD is only one way to arrive at the rank reduced Matrix $B_{m \times n} = U \Sigma V_H$, but that the dimensions of the matrix are not to be changed by the mathematical process selected and the top K elements maintain their relationships. The inventor has proven that eigenimages may be used and summed more quickly, but tend to be less accurate than the results from using SVD for rank reducing Matrix $B_{m \times n} = U \Sigma V^H$. For example, although the SVD means of fully decomposing a matrix works well for rank reduction, reasonable approximations to full decomposition can be computed using Lanczos bi-diagonalization that can require as little as one-tenth the computational time of the SVD method yet the quality of Lanczos results is similar to the SVD results. Advantageously, when removing noise from large data sets, the method of the present invention can be executed much faster than the closest known competing method, being f-xy prediction filtering.

The method of the present invention works equally well on both flat and structured data because this method does nothing to a noiseless seismic grid containing no more than K dips, which (unlike eigenimage filtering in the time domain) is because the method of the present invention operates in the frequency domain of each trace.

According to a preferred embodiment of the method of the present invention not all of the frequency slices need to be rank reduced. Typically seismic traces are sampled in time at a rate such that the signal frequencies are a fraction of the Nyquist frequency. For example, it is common for seismic data to have significant signal only between frequencies 10 and 80 Hz (the appropriate signal band is well known to persons of skill in the art of seismic processing), yet the Nyquist frequency is often 125 or 250 Hz—consequently only matrices 540 based on frequency slices between 10 and 80 Hz need to be rank reduced. The remainder can be left unchanged or zeroed each resulting in a considerable savings in computation.

Advantageously, according to an alternate embodiment, the method of the present invention can handle erratic noise quite well by identifying the rank K matrices that are near the subject input matrix in an L1-norm sense using a robust SVD (Hawkins, Liu, and Young, 2001).

Figure 8:
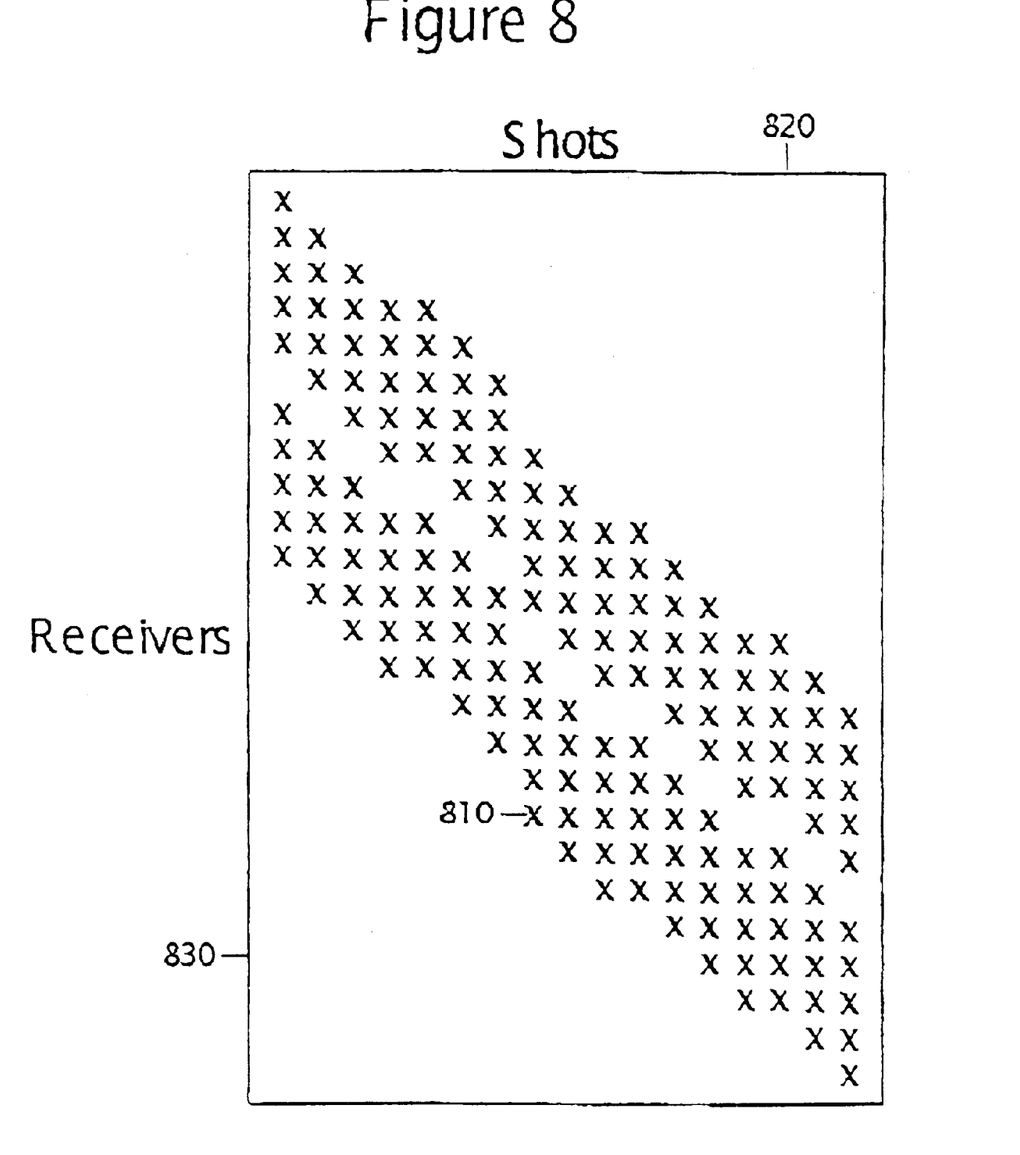
Figure 9:
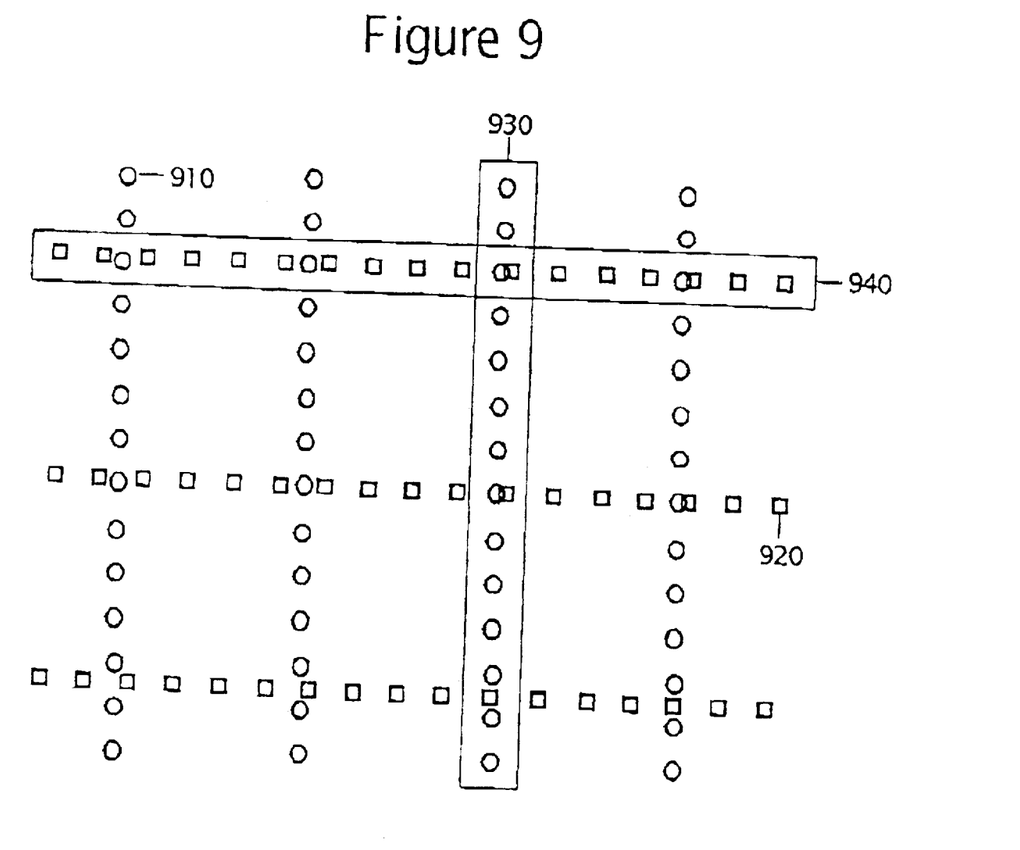

As illustrated in the "surface stacking diagram" of FIG. 8, the method of the present invention can be applied to unstacked 2-D seismic data sets when unstacked traces 810 are laid out on a two-dimensional grid on which the trace shot (ordered by increasing receiver/station position) forms one axis 820 and the trace receiver forms the other axis 830, such that the data has the appearance of a stacked 3-D section permitting noise removal to be performed as set out above. Referring to FIG. 9 it is illustrated that the method of the present invention can be applied to an unstacked 3-D seismic data set. In a typical 3-D acquisition, shots 910 are positioned spatially along a multitude of "shot lines", and receivers 920 are positioned spatially along a multitude of "receiver lines". To perform noise removal according to an alternate application of the method of the present invention, extract all traces having been acquired on a single shot line 930 and a receiver line 940. These traces are then laid out on a spatial grid where shots from the shot line form one axis and receivers from the receiver line form the other axis—giving the data the appearance of a stacked 3-D section on which noise removal may be performed as set out above. The foregoing process is repeated for all remaining combinations of shot lines and receiver lines.

The method of the present invention works well for 2-D and 3-D unstacked data sets because: the method is independent of x- and y-consistent statics (i.e. the Statics Property); the method is exact for a noiseless seismic grid that has no more than K dips, and has then had x- and y-consistent filters applied (i.e. the Filtering Property); and if the method is exact for a seismic grid then the method is also exact the same seismic grid which has had rows or columns of traces duplicated or removed (i.e. the Shooting Property). Advantageously, as a result of the Statics and Filtering properties, and the fact that the matrix rows and columns are selected to represent common shots and receivers, the random noise removal can preserve surface-consistent effects, allowing the method to be applied at a very early stage of processing. To extract rectangular grids from unstacked 2-D and 3-D data sets for noise removal, the x axis represents shots and y represents receivers because then surface-consistent (that is, shot and receiver) effects are left undistorted by the method as a result of a synergy between the method's ability to absorb, or leave undistorted, x- and y-consistent effects, and the manner of extracting rectangular grids of traces from pre-stack data sets.

Advantageously, the method of the present invention works well along a straight spatial boundary, since from the method's point of view there is no boundary, which makes the method well-suited for removing noise from common-offset or common-angle stacks, in which many of the traces are at or near a boundary. For common-offset or common-angle stacks from a 2-D acquisition, the traces are naturally laid out in a 2-D spatial grid, making it possible to perform noise removal as if it were a stacked 3-D section. Advantageously, the method is independent of the row and column ordering as a result of the Ordering Property.

According to an alternate embodiment of the method of the present invention noise reduction can be designed on one set of data, but applied on another. The design data can be taken from different time windows of the same traces as the application data, or from a different set of traces. This is made possible where matrix A holds the DFT values for a given frequency of the design data, and matrix C holds the DFT values for a given frequency of the application data—it is possible to calculate matrix B by projecting matrix C onto the rank K subspace of matrix A corresponding to its first K singular values.

According to an alternate embodiment of the method of the present invention, in the frequency x-y plane for a given frequency a rank K matrix may be produced using eigen-analysis wherein K is the number of plane waves, which fact allows the separation of plane waves by eigen-image decomposition. A single frequency slice is rank-reduced by placing this 2-D) grid of complex DFT values into a complex-valued matrix of the same dimensions, finding the nearest rank-K matrix to this matrix, where K is some value greater than or equal to one, and replacing the constant-frequency slice values with the values from the rank-K matrix.

According to an alternate embodiment of the method of the present invention, by applying different noise filters to the design data, it is possible to remove coherent noise from seismic data, as well as random noise, which permits tailoring the signal subspace to avoid, and thus remove, coherent energy.

Although the disclosure describes and illustrates various embodiments of the invention, it is to be understood that the invention is not limited to these particular embodiments. Many variations and modifications will now occur to those skilled in the art of processing seismic data. For full definition of the scope of the invention, reference is to be made to the appended claims.

I claim:

1. A method of removing noise from a time-domain based CUBE of seismic data consisting of a plurality of Traces, the method comprising the steps:

transform each said Trace into the frequency-domain, for the purpose of creating a frequency-domain based CUBE of seismic data, wherein the seismic data elements of said frequency-domain based CUBE are complex-valued;

disassemble said frequency-domain based CUBE into a plurality of constant frequency slices, each of said constant frequency slices consisting of a plurality of seismic data elements; and for each constant frequency slice of said plurality of constant frequency slices:

form one Matrix $A_{m \times n}$ from each said constant frequency slice using said plurality of seismic data elements as the complex-valued elements of said Matrix $A_{m \times n}$;

rank-reduce Matrix $A_{m \times n}$ to create a rank-reduced Matrix $B_{m \times n}$ that is representative of Matrix$_{m \times n}$;

substitute Matrix $B_{m \times n}$ in place of Matrix $A_{m \times n}$, for the purpose of forming a proxy slice that is representative of said constant frequency slice;

assemble a proxy frequency-domain based cube using said proxy slice, for the purpose of accessing each proxy trace in a plurality of frequency ordered proxy traces that are representative of said plurality of Traces; and inverse transform into the time-domain each proxy trace of said plurality of frequency ordered proxy traces, for the purpose of forming a noise-suppressed time-domain based proxy cube representative of said time-domain based CUBE of seismic data.

2. The method as claimed in claim 1 further comprising the step of correlating said noise-suppressed time-domain based proxy cube with at least one other noise-suppressed time-domain based proxy cube associated with a common seismic data set.

3. The method as claimed in claim 1 wherein said noise is random noise.

4. The method as claimed in claim 1 wherein each said Trace is transformed into the frequency-domain using a Discrete Fourier Transform.

5. The method as claimed in claim 1 wherein said time-domain based CUBE comprises a plurality of time-domain based grids.

6. The method as claimed in claim 1 wherein the step of rank-reducing said Matrix $A_{m \times n}$ is carried out by decomposition executed using Singular Value Decomposition comprising the steps:

decompose said Matrix $A_{m \times n}$ in accordance with $A_{m \times n} = U\Sigma V^H$, where $\Sigma$ is an ordered diagonal matrix and U and $V^H$ are unitary, for the purpose of ordering the elements of said $\Sigma$ from largest at $a_{11}, a_{22}, a_{33}$, decreasing to smallest at $a_{mn}$; and forming a Matrix $B_{m \times n}$ that is of rank $\Sigma$ where K is less than the lesser of m or n, and in the ordered diagonal matrix $\Sigma$ all but the top K elements along the diagonal are zeroed by replacing with zero values all but the top K elements along the diagonal of $\Sigma$ to form $\Sigma$, after which Matrix $A_{m \times n}$ is recomposed as: $B_{m \times n} = U\Sigma V^H$, where $\Sigma$ is the rank-reduced version of $\Sigma$ having only the top K elements remaining non-trivial.

7. The method as claimed in claim 1 wherein the step of rank-reducing Matrix $A_{m \times n}$ is carried out by decomposition and only partially executed using Lanczos bi-diagonalization, for the purpose of achieving a reasonable approximation to full decomposition.

8. The method as claimed in claim 1 wherein the step of rank reducing Matrix $A_{m \times n}$ is carried out by decomposition executed using the L1 matrix norm.

9. The method as claimed in claim 6 wherein the top K elements may be weighted or otherwise adjusted or processed.

10. The method as claimed in claim 6 wherein the value of K is determined by first applying a plurality of values of K and plotting the difference between said Matrix $A_{m \times n}$ and said Matrix $B_{m \times n}$ for each value of K of said plurality of values of K, and then selecting as the value of K that for which the plot of said difference shows insignificant indications of genuine reflector signal, for the purpose of removing noise without distorting genuine reflector signal.

11. The method as claimed in claim 1 further comprising the step of first spatially dividing the planar surface of a section of seismic data into overlapping planar grids for the purpose of correlating seismic data relating to a specific reflector.

12. The method as claimed in claim 1 wherein said CUBE is formed using any of:

a rectangle of traces extracted from a stacked 3-D volume, the trace grid being comprised of inline CMP bins in the row direction and crossline CMP bins in the column direction;

traces from an unstacked 2-D line, the grid being composed of common source traces in the row direction and common receiver traces in the column direction;

traces from an unstacked 3-D volume, where the traces are taken from a single shot line and receiver line, the trace grid being comprised of common source traces in the row direction and common receiver traces in the column direction; or traces from common-offset or common-angle stacks for a sequence of CMPs, the trace grid being comprised of common-offset or -angle traces in the row direction and CMP traces in the column direction.

\* \* \* \* \*